United States Patent
Yeh

(10) Patent No.: US 6,824,162 B2
(45) Date of Patent: Nov. 30, 2004

(54) BACKREST STRUCTURE FOR STROLLERS

(75) Inventor: Chuan-Ming Yeh, Chia-I (TW)

(73) Assignee: Link Treasure Limited, Tortola (VG)

( * ) Notice: Subject to any disclaimer, the term of this patent is extended or adjusted under 35 U.S.C. 154(b) by 64 days.

(21) Appl. No.: 10/321,376

(22) Filed: Dec. 18, 2002

(65) Prior Publication Data

US 2003/0122351 A1 Jul. 3, 2003

(30) Foreign Application Priority Data

Dec. 31, 2001 (TW) .................................. 90223745 U

(51) Int. Cl.[7] .............................. B62B 3/02; B62B 7/00
(52) U.S. Cl. .................... 280/642; 280/650; 280/47.38
(58) Field of Search ............................ 280/638, 639, 280/38, 39, 642, 647, 650, 657, 658, 47.38, 47.41, 47.4

(56) References Cited

U.S. PATENT DOCUMENTS

| | | | | |
|---|---|---|---|---|
| 4,741,551 A | * | 5/1988 | Perego | 280/642 |
| 4,770,437 A | * | 9/1988 | Glaser | 280/642 |
| 5,143,398 A | * | 9/1992 | Teng | 280/642 |
| 5,240,265 A | * | 8/1993 | Huang | 280/47.4 |
| 5,447,323 A | * | 9/1995 | Huang | 280/642 |
| 5,454,584 A | | 10/1995 | Haut et al. | |
| 5,460,398 A | * | 10/1995 | Huang | 280/642 |
| 5,482,311 A | * | 1/1996 | Huang | 280/642 |
| 5,823,564 A | * | 10/1998 | Kettler | 280/642 |
| 5,979,928 A | * | 11/1999 | Kuo | 280/642 |
| 6,155,740 A | * | 12/2000 | Hartenstine | 403/102 |
| 6,412,809 B1 | * | 7/2002 | Bigo et al. | 280/642 |

* cited by examiner

Primary Examiner—Christopher P. Ellis
Assistant Examiner—Brian Swenson
(74) Attorney, Agent, or Firm—Birch, Stewart, Kolasch & Birch, LLP

(57) ABSTRACT

A backrest structure for strollers has a linkage bar to connect the frame and the backrest to enable the backrest of the stroller to be folded or anchored synchronously with the collapsing or extending of the frame. The backrest structure includes a backrest-adjusting device to provide the linkage movement and also offer multiple stage adjustment of the backrest angle.

6 Claims, 4 Drawing Sheets

US 6,824,162 B2

BACKREST STRUCTURE FOR STROLLERS

This nonprovisional application claims priority under 35 U.S.C. §119 (a) on Patent Application No. 90223745 filed in Taiwan on Dec. 31, 2001, which is herein incorporated by reference.

FIELD OF THE INVENTION

The invention relates to a backrest structure for strollers that is movable synchronously with the stroller frame and adjustable angularly in multiple stages.

BACKGROUND OF THE INVENTION

Strollers (infant carriers) are generally designed with a collapsible function to facilitate carrying and storage. Many folding features have been developed over the years to enhance operation effectiveness. For instance, U.S. Pat. No. 5,454,584 discloses a collapsible stroller that has a frame movable between a collapsed position and an operating position. It has a back movable between a first position (sitting position) and a second position (recumbent position). A latch means is provided between the frame and the back that includes a boss in a rear leg tube and a slot on a latch. The boss may be positioned within the slot to keep the back at the first position. The latch means, back and frame are so designed that when the back is at the first position, the frame may be moved from the operating position to the collapsed position, and when the boss is separated from the slot, the latch means automatically releases the back to allow the back to move (drop) automatically to the second position. Hence users do not need to release the back separately to fold the stroller. Although the cited patent claims it enables the back to move (drop) automatically when the stroller is folding, the boss cannot always overcome the friction between the slot and the boss and separate smoothly from the slot. As a result, the back does not always move automatically as desired. Thus users have to release the back separately to fold the stroller. There is a need to design an improved backrest mechanism to fold the back effectively and safely.

SUMMARY OF THE INVENTION

The primary object of the invention is to provide a backrest structure that has a linkage bar between the frame and the backrest so that the backrest may be folded or extended synchronously with the collapsing or extension of the frame. The backrest structure maintains the stability of the backrest while the stroller is moving to improve the safety of the infant.

Another object of the invention is to provide a backrest adjusting means to enable the backrest to interact with the linkage bar and provide multiple stages of adjustment for the angle of the backrest to enhance comfort for the infant.

According to the invention, the stroller includes a frame movable between a sitting position and a collapsed position and a loading rack having an anchor section, which has a portion for seating the passenger. The backrest structure of the invention includes a backrest adjusting means that is pivotally mounted on the anchor section, a movable backrest that is pivotally engaged with the backrest adjusting means and is movable between a first position and a second position when the frame is at the sitting position—with the passenger sitting generally upright when the backrest is at the first position and lying rearwards when the backrest is at the second position—and a linkage bar with a first end pivotally engaged with the frame and a second end pivotally engaged with the backrest adjusting means. When the frame is at the sitting position, the linkage bar supports the backrest adjusting means and the backrest at the first position. When the frame is moved from the sitting position to the collapsed position, the frame moves the linkage bar and pushes the backrest adjusting means to make the backrest turn synchronously with the frame and fold at the second position to enable the stroller be folded smoothly. In addition, when the frame is at the sitting position, the backrest adjusting means may be adjusted in multiple stages to alter the angle of the backrest to suit the passenger's requirements.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
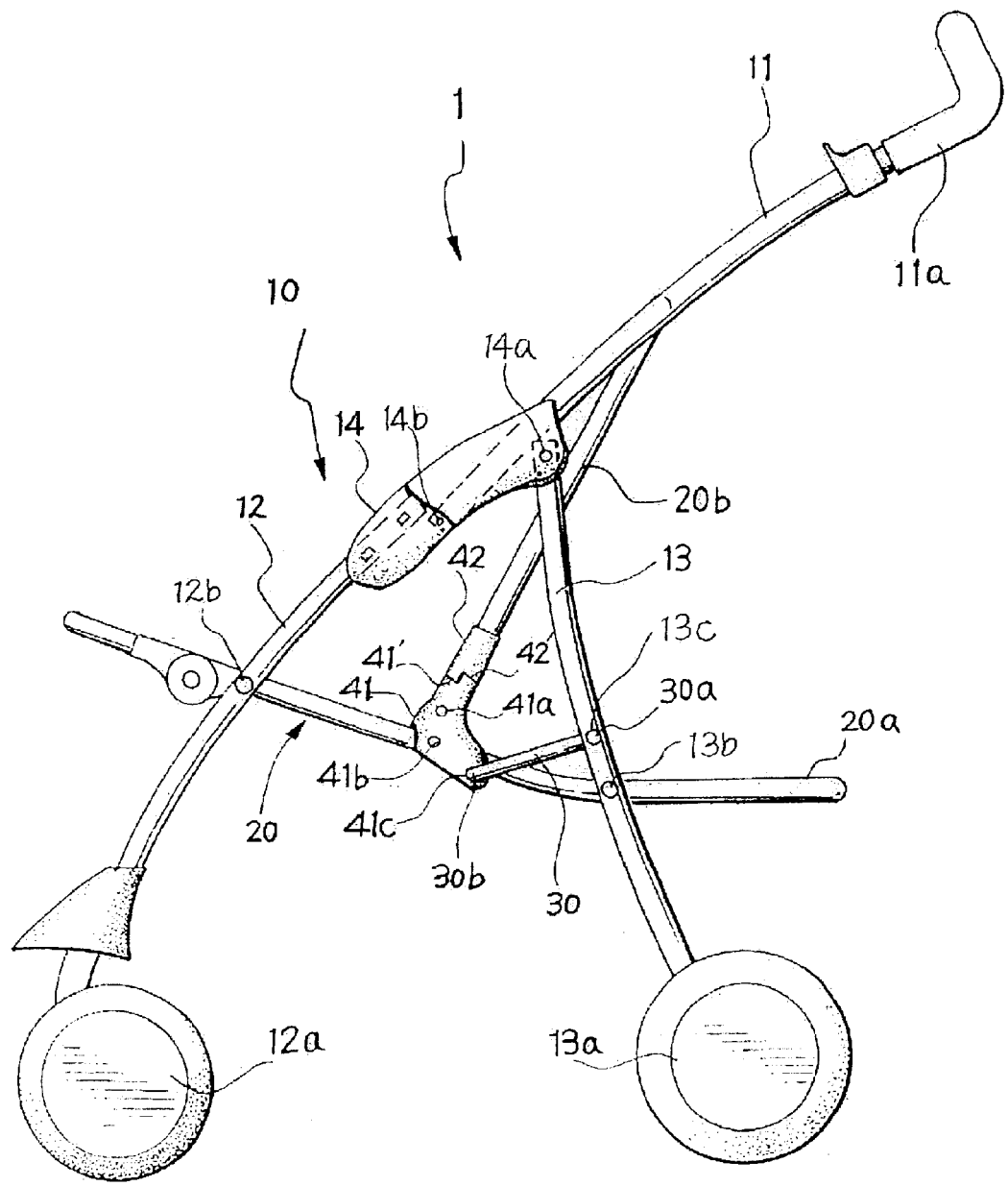
FIG. 1 is a schematic view of the stroller of the invention at the sitting position.

Refer to FIG. 1 for a stroller 1 at a sitting position. The stroller 1 has a frame 10 that includes a push tube (first rack) 11, a front leg tube (second rack) 12, a rear leg tube (third rack) 13, a latch means 14 and a seat tube (loading rack) 20. The seat tube includes an anchor section 20a that has a portion for seating a passenger.

The push tube 11 has a first end connecting to a handle 11a and a second end pivotally engaging with the latch means 14. The front leg tube 12 has a first end fastening to the latch means 14 and a second end engaging with a plurality of front wheels 12a. The front leg tube 12 further has a pivotal point 12b between the first end and the second end to pivotally engage with the anchor section of the seat tube. The rear leg tube 13 has a first end pivotally engaging with the latch means 14 and a second end engaging with a plurality of rear wheels 13a. The rear leg tube 13 further has a pivotal point 13b between the first end and the second end to pivotally engage with the anchor section of the seat tube. The latch means 14 may latch or separate the push tube 11 and the front leg tube 12. The structure of the latch means 14 is known in the art and forms no part of the invention. Any conventional latch mechanism that provides latching or separating functions may be adopted, such as the one disclosed in U.S. Pat. No. 5,454,584.

The backrest structure for the stroller of the invention includes a movable backrest 20b, a backrest adjusting means 40 and a linkage bar 30.

Figure 2:
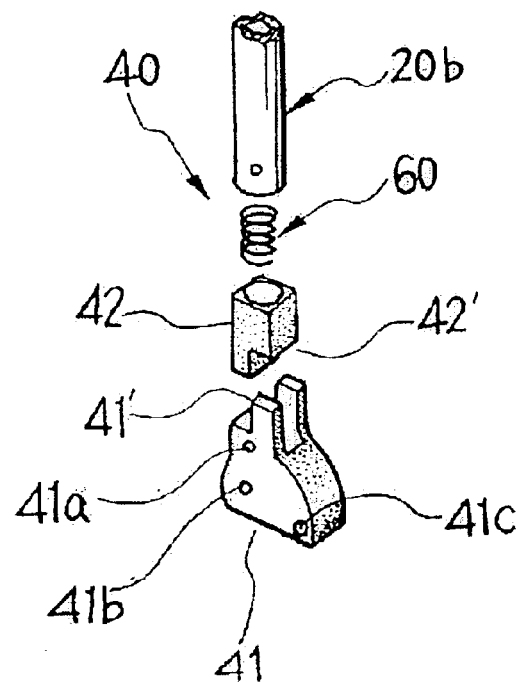
FIG. 2 is an exploded view of the backrest adjusting means of the backrest structure of the invention.

Referring to FIGS. 1 and 2, the backrest adjusting means 40 includes a rotary member 41, an anchor member 42 and a spring 60. The rotary member 41 has one end forming a stepwise surface 41' and has a first pivotal point 41 a to pivotally engage with the backrest 20b, a second pivotal point 41b to pivotally engage with the anchor section 20a, and a third pivotal point 41c.

Figure 3:
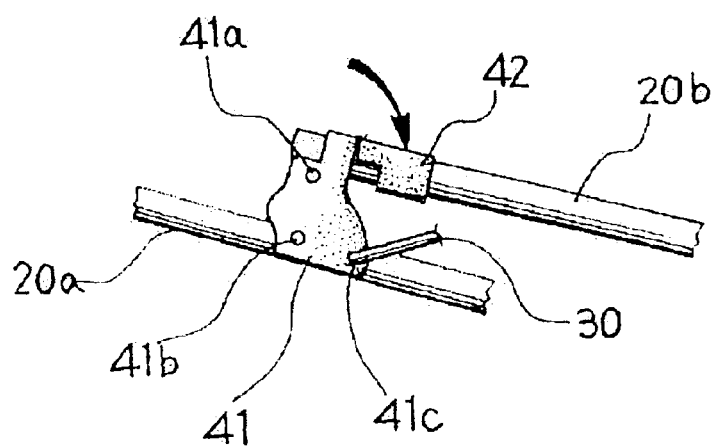
FIG. 3 is a schematic view of the backrest structure of the invention at the lying position according to FIG. 1.

The anchor member 42 is coupled with the backrest 20b and has one end forming a stepwise surface 42' mating and engaging with the stepwise surface 41' of the rotary member 41. The spring 60 is located inside the backrest 20b to provide force to allow the anchor member 42 to engage with the rotary member 41. When the stroller 1 is at the sitting position (as shown in FIG. 1), the stepwise surface 42' of the anchor member 42 engages with the stepwise surface 41' of the rotary member 41, and the backrest 20b is erected upwards at the first position (as shown in FIG. 1) to provide back support for the sitting infant or child. When the anchor member 42 is separated from the rotary member 41, the backrest 20b may be turned about the first pivotal point 41a to the lying position (as shown in FIG. 3).

When the stepwise surfaces 41' and 42' have only one step, the backrest has only the first position and the lying position for two-stage adjustment. When the stepwise surfaces 41' and 42' have more than one step, the backrest may have adjusting inclination of three stages or more.

The linkage bar 30 has one end 30a pivotally engaging with the pivotal point 13c of the rear leg tube 13 and a second end 30b pivotally engaging with the third pivotal point 41c of the rotary member 41. When the stroller is at the sitting position and the backrest 20b is at the first position and erecting upwards, the linkage bar 30 supports the rotary member 41 and the backrest 20b.

Figure 4:
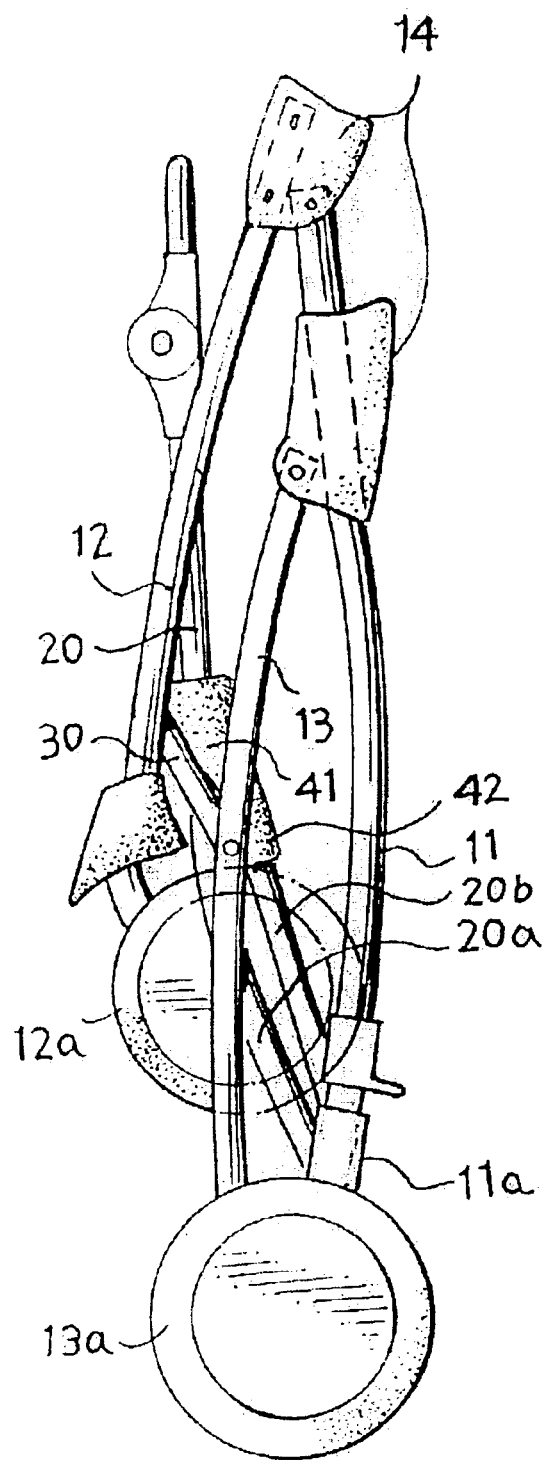
FIG. 4 is a schematic view of the stroller of the invention at the collapsed position.
Figure 5:
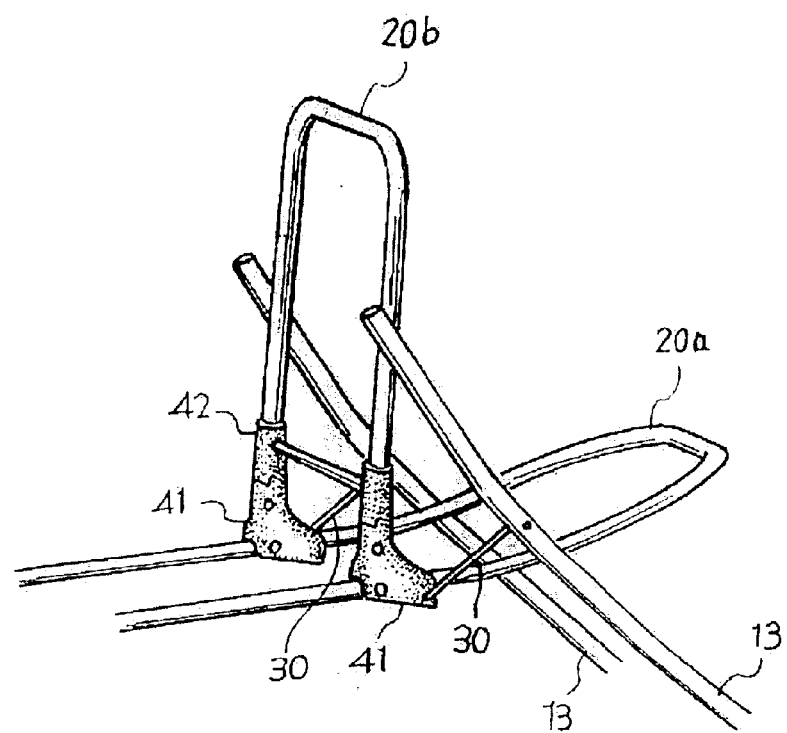
FIG. 5 is a perspective view of the invention according to FIG. 1, with the backrest at the first position.
Figure 6:
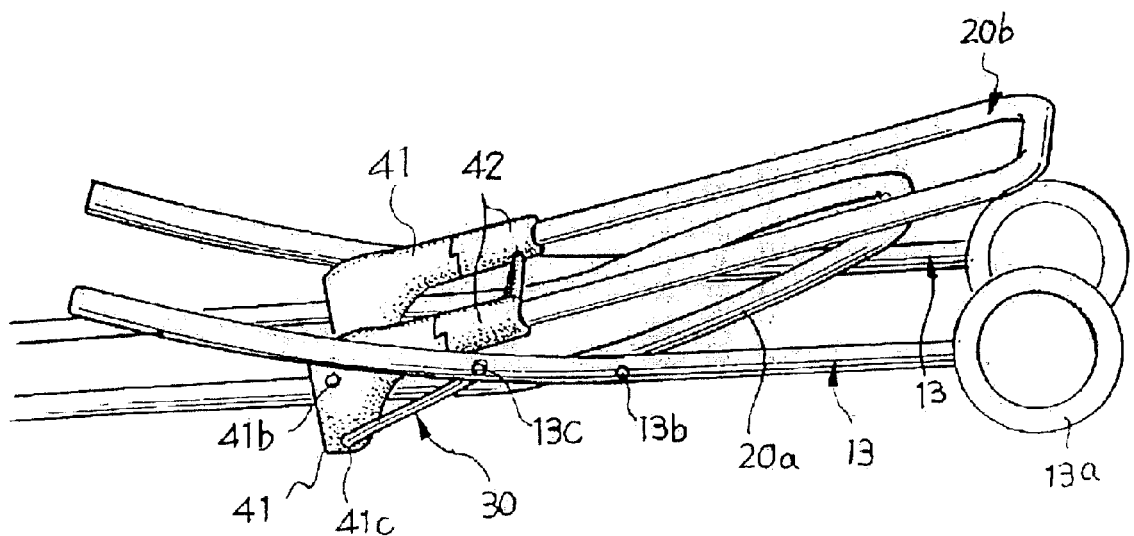
FIG. 6 is a fragmentary perspective and enlarged view of the invention according to FIG. 4, with the backrest at the second position.

When the stroller is moved from the sitting position to the collapsed position for folding (as shown in FIG. 4), the rear leg tube 13 turns about the pivotal point 14a of the latch means 14, drives the linkage bar 30 and pushes the backrest adjusting means 40 to turn about the second pivotal point 41b. Thus the backrest 20b is turned synchronously with the rear leg tube 13 to the second position for folding (as shown in FIG. 6).

The following is a summary of the movement principle and function of the backrest structure of the invention. When the stroller 1 is moved from the sitting position (as shown in FIG. 1) to the collapsed position (shown in FIGS. 4 and 6), first, the user releases the latched condition of the latch means 14 to separate the push tube 11 from the front leg tube 12. Next, the user moves the handle 11a of the push tube 11 to turn clockwise about the pivotal point 14b of the latch means according to FIG. 1, the push tube 11 is moved close to the front leg tube 12 and drives the rear leg tube 13 at the same time, and the rear leg tube 13 turns about the pivotal point 14a of the latch means and moves to the front leg tube 12. Meanwhile, the rear leg tube 13 drives the anchor section 20a of the seat tube to turn about the pivotal point 12b and moves to the front leg tube 12. The rear leg tube 13 drives the linkage bar 30 at the same time. The linkage bar 30 exerts force on the third pivotal point 41c of the backrest adjusting means 40 through one end 30b to make the backrest adjusting means 40 turn clockwise about the second pivotal point 41b. Thereby the backrest 20, which is folded onto the backrest adjusting means 40, is turned synchronously towards the seat tube 20a until it reaches the second position (as shown in FIG. 6).

In contrast, when the stroller 1 is moved from the collapsed position (FIG. 4) to the sitting position (FIG. 1), the backrest adjusting means 40 is driven by the linkage bar 30 and turns the backrest 20b synchronously to the sitting position of the stroller 1 for anchoring (FIG. 1).

In addition, when the stroller 1 is at the sitting position, and is moved to separate the complementary surfaces 41' and 42' of the rotary member 41 and the anchor member 42, the backrest 20b may be turned about the first pivotal point 41a to the lying position, which is almost on the same plane as a portion of the anchor section 20a, so that the infant may be laid thereon. It is to be understood that in such a condition, when folding the stroller, the linkage bar 30 also drives the rear leg tube 13 and the backrest adjusting means 40 to move synchronously. During the folding process the anchor member 42 of the backrest adjusting means 40 automatically latches onto the rotary member 41, as shown in FIG. 6.

The novel design of the backrest structure of the invention enables the backrest of the stroller to turn synchronously with the collapsing or extending of the frame for folding or anchoring. In addition, the linkage bar can support the backrest adjusting means 40, and therefore can maintain the stability of the backrest 20b latched on the backrest adjusting means 40 to enhance the safety of the infant while the stroller is moving.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A backrest structure for a collapsible stroller which has a frame movable between a sitting position and a collapsed position, and a loading rack mounted on the frame having an anchor section which has a portion for seating a passenger, comprising:

a backrest adjusting means pivotally mounting on the anchor section;

a movable backrest pivotally engaging with the backrest adjusting means and being movable between a first position and a second position when the frame is at the sitting position, the backrest being substantially erected upwards at the first position to allow the passenger leaning thereon, the backrest being located at the second position when the frame is at the collapsed position; and a linkage bar having a first end pivotally engaging with the frame and a second end pivotally engaging with the backrest adjusting means, the linkage bar supporting the backrest adjusting means and the backrest at the first position when the frame is at the sitting position, the frame driving the linkage bar and moving the backrest adjusting means to turn the backrest synchronously with the frame to the second position for folding when the frame is moved from the sitting position to the collapsed position;

wherein the frame includes:

a latch means for latching the frame on the sitting position and releasing the frame from the sitting position;

a first rack having a first end connecting to a handle and a second end pivotally engaging with the latch means;

a second rack having a first end fastened to the latch means, a second end pivotally engaging with a plurality of front wheels, and a pivotal point located between the first end and the second end thereof to pivotally engage with one end of the anchor section of the loading rack; and a third rack having one end pivotally engaging with the latch means, a second end pivotally engaging with a plurality of rear wheels, and a pivotally point located between the first end and the second end thereof to pivotally engage with another end of the anchor section of the loading rack.

2. The backrest structure for a stroller of claim 1, wherein the first end of the linkage bar is pivotally engaged with the third rack, and the second end of the linkage bar being pivotally engaged with the backrest.

3. A backrest structure for a collapsible stroller which has a frame movable between a sitting position and a collapsed position, and a loading rack mounted on the frame having an anchor section which has a portion for seating a passenger, comprising:

- a backrest adjusting means pivotally mounting on the anchor section;
- a movable backrest pivotally engaging with the backrest adjusting means and being movable between a first position and a second position when the frame is at the sitting position, the backrest being substantially erected upwards at the first position to allow the passenger leaning thereon, the backrest being located at the second position when the frame is at the collapsed position; and
- a linkage bar having a first end pivotally engaging with the frame and a second end pivotally engaging with the backrest adjusting means, the linkage bar supporting the backrest adjusting means and the backrest at the first position when the frame is at the sitting position, the frame driving the linkage bar and moving the backrest adjusting means to turn the backrest synchronously with the frame to the second position for folding when the frame is moved from the sitting position to the collapsed position, wherein the backrest adjusting means includes:
  - a rotary member having one end forming a stepwise surface of at least one step, a first pivotal point pivotally engaging with the backrest, a second pivotal point pivotally engaging with the anchor section and a third pivotal point pivotally engaging with the second end of the linkage bar;
  - an anchor member slidably coupling with the backrest and having one end forming a stepwise surface complementary and engagable with the stepwise surface of the rotary member, wherein the backrest is turnable about the first pivotal point to a lying position when the anchor member is separated from the rotary member; and
  - an elastic element located in the backrest to provide a force to engage the anchor member with the rotary member.

4. The backrest structure for a stroller of claim 3, wherein the rotary member has one side which has a cavity to hold a tail end of the backrest.

5. The backrest structure for a stroller of claim 3, wherein the elastic element is a helical spring.

6. A stroller collapsible automatically being movable between a sitting position and a collapsed position, comprising:

- a seat tube having an anchor section and a movable backrest, the anchor section having a portion for holding an infant, the backrest being pivotally engaged with the anchor section and being movable between a first position and a second position, the backrest being substantially erected upwards at the first position to allow a passenger leaning thereon, the backrest being directed substantially rearwards to allow the passenger lying thereon at a lying position, the backrest being located on the first position or the lying position when the stroller is at the sitting position, and being located on the second position when the stroller is at the collapsed position;
- a latch means;
- a push tube having a first end and a second end, the first end being connected to a handle, the second end being pivotally engaged with the latch means;
- a front leg tube having a first end, a second end and a pivotal point located between the first end and the second end thereof, the first end being fastened to the latch means, the second end being engaged with a plurality of front wheels, the pivotal point being pivotally engaged with one end of the anchor section of the seat tube;
- a rear leg tube having a first end, a second end and a pivotal point located between the first end and the second end thereof, the first end being pivotally engaged with the latch means, the second end being engaged with a plurality of rear wheels, the pivotal point being pivotally engaged with another end of the anchor section of the seat tube; and
- a backrest adjusting means including:
  - a rotary member having one end forming a stepwise surface of at least one step, a first pivotal point pivotally engaging with the backrest, a second pivotal point pivotally engaging with the anchor section and a third pivotal point;
  - an anchor member slidably coupling with the backrest and having one end forming a stepwise surface complementary and engagable with the stepwise surface of the rotary member, wherein the backrest is turnable about the first pivotal point to the lying position when the anchor member is separated from the rotary member;
  - an elastic element located in the backrest to provide a force to engage the anchor member with the rotary member; and
  - a linkage bar having a first end pivotally engaging with the rear leg tube and a second end pivotally engaging with the third pivotal point of the rotary member, the linkage bar supporting the rotary member and the backrest when the stroller is at the sitting position and the backrest is at the first position, the rear leg tube driving the linkage bar and moving the backrest adjusting means to turn the backrest synchronously with the rear leg tube to the second position for folding when the stroller is moved from the sitting position to the collapsed position.

* * * * *